Dec. 11, 1928.

L. M. SPENCER 1,694,757

MEANS FOR REMOVING SNOW AND ICE FROM WINDSHIELDS

Filed Oct. 10, 1925

Inventor
LOUIS M. SPENCER

By Blackmore, Spencer & Flint
Attorneys.

Patented Dec. 11, 1928.

1,694,757

UNITED STATES PATENT OFFICE.

LOUIS M. SPENCER, OF DETROIT, MICHIGAN, ASSIGNOR TO GENERAL MOTORS CORPORATION, OF DETROIT, MICHIGAN, A CORPORATION OF DELAWARE.

MEANS FOR REMOVING SNOW AND ICE FROM WINDSHIELDS.

Application filed October 10, 1925. Serial No. 61,827.

This invention relates to means for removing ice and snow from the windshields of automotive vehicles and, incidentally thereto, likewise to means for heating the space occupied by the passengers or driver. In a desirable embodiment thereof, as set forth in detail herein, I utilize the usual engine cooling fan to direct a blast of air, heated by passing closely about the exhaust manifold, upwardly and forwardly against the inner lower portion of the windshield, thus heating the glass locally to an extent which prevents ice or snow from sticking or forming thereon, thereby enabling the ordinary windshield cleaner to perform its cleaning functions properly. By thus applying the heat locally directly to the inner surface of the glass the film of moisture immediately on the outer side of the glass is kept constantly melted and ice and snow striking thereagainst quickly slides down out of the line of vision or is swept away by the cleaner bar—this, moreover, without undue warmth in the space occupied by passengers or driver.

To this end and for the further purpose of concealing the parts, I preferably lead off from a car heater of a well known type a conduit or passage which is arranged to project upwardly between the instrument board or panel and the cowl support which extends across the body from side to side slightly forward of said panel; and in this passage I place a valve whereby the discharge of heated air against the inner surface of the glass may be regulated.

The invention is especially adapted for use in connection with one-piece windshields of the type now recently come into common use and in which the extent of lift of the glass is insufficient to permit the driver to see thereunder, but it may be applied to other shields, either movable or immovable.

Figure 1:
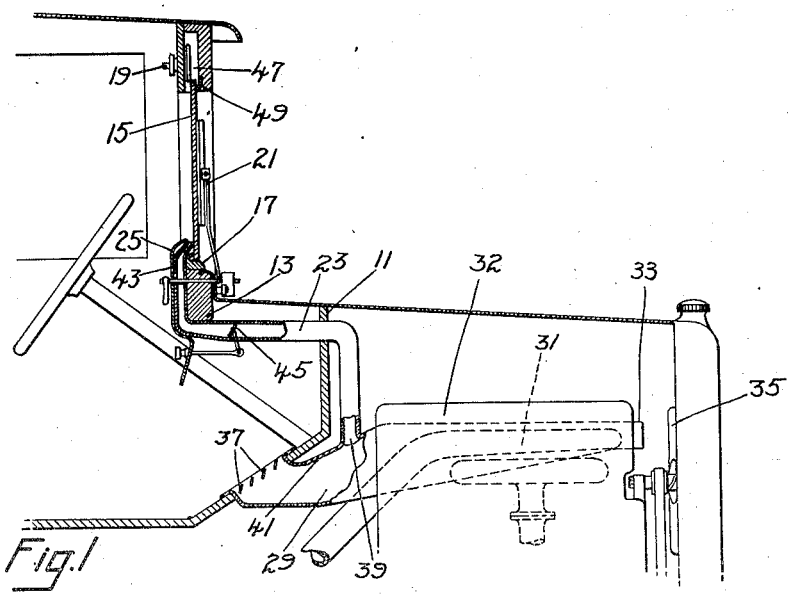
Figure 2:
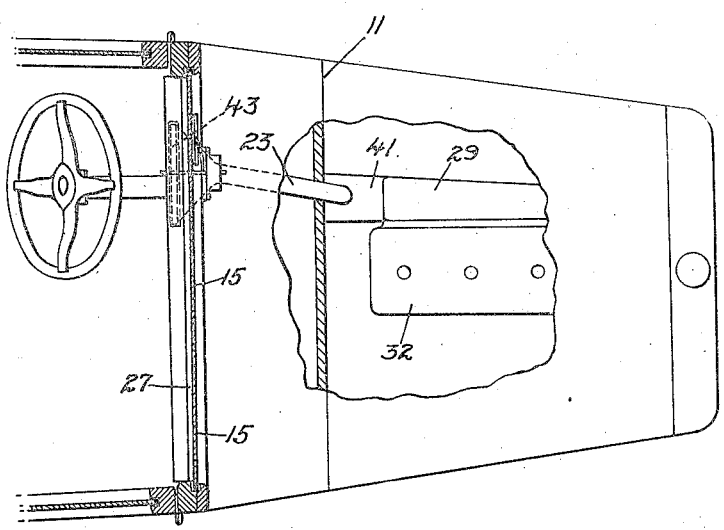

Both the construction and operation will be better understood from the accompanying drawings, in which:

Figure 1 is a sectional view through an automobile showing one form of the device; and Figure 2 is a plan view, partly in section, of Figure 1.

Referring to the drawings, an automobile 11 is shown provided with a cowl support 13 upon which a one-piece windshield 15 seats when in closed position. A sealing strip 17 is shown between the windshield and support. The usual windshield operating mechanism is shown at 19 for raising or lowering the windshield. With the one-piece type windshield the glass cannot be raised far enough for the driver to see the road without looking through the glass, the open space being for ventilation. In cold, rainy weather moisture collects on the windshield and the driver's vision is obscured.

A windshield cleaner 21 is shown for removing moisture on the exterior of the windshield. At freezing temperature the cleaner fails to remove the frozen moisture and at times is inoperative, being frozen in the ice. To overcome this difficulty a conduit 23 is arranged to direct heated air against the interior of the windshield.

A panel 25, in the form of a dash, is spaced from the cowl support 13 providing a space 27 for the purpose of ventilation when the windshield is raised admitting fresh air to the interior of the car. This space 27 provides a convenient place to mount the conduit 23 which is not visible to the occupants of the car.

A heater 29, surrounding the exhaust manifold 31 of an engine 32, is open at its forward end as at 33 adjacent the usual fan 35. The opposite end of the heater is open at its rear end and provided with shutters 37. It will be understood that air passing through the heater, caused by the fan or forward movement of the car, will be heated by the exhaust manifold and warm the interior of the car. The conduit 23 is in communication with the heater as at 39 so that some of the heated air enters the conduit 23. The surface 41 of the heater is shown inclined to aid in directing the heated air through the conduit. The opposite or upper end 43 of the conduit is shown expanded and flattened to distribute the heated air over a larger portion of the windshield. A valve 45, located in the conduit, regulates the amount of heated air desired.

If desired, the conduit 23 may terminate at the lower portion of the open space 27 to direct the heated air to the full surface of the windshield, in which case the conduit would be of appreciably greater cross-section.

By applying heated air to the interior of the windshield it is sufficiently heated to melt the inner film or surface of the ice and allow it to slide down off of the windshield. It is not necessary to completely melt the ice when the heat is applied to the internal surface as a little heat will loosen it, but when heat is applied to the external surface more heat is required. The internal heating also removes and prevents condensation on either side of the windshield thus giving the driver a clear vision at all times as well as a windshield which can be easily raised or lowered without tendency to jam through accumulation of ice thereon.

While one illustrative embodiment of my invention has been described at length, it is not my intention to limit its scope by the above description, or otherwise than by the terms of the appended claims.

I claim:

1. In a device of the class described, the combination with an automobile having a cowl support, a panel spaced therefrom, a windshield, a heater, a conduit having one end in communication with said heater and the opposite end extending between said support and said panel adapted to direct heated air against the internal surface of said windshield.

2. In a device of the class described, the combination with an automobile having a cowl support, a panel spaced therefrom, a windshield, a heater, and a conduit having one end communicating with said heater and the opposite end expanded laterally and extending between said support and said panel adapted to direct heated air against the internal surface of said windshield.

3. In a motor vehicle, a cowl, a panel, a windshield spaced forwardly of said panel and above said cowl, a source of heat and a conduit extending from said source of heat beneath said cowl and terminating at the base of the windshield immediately in front of said panel whereby the windshield is heated by means concealed from view.

4. In a motor vehicle, a vertically slidable windshield section, a cowl support extending crosswise of the vehicle and toward and from which said section is movable, a panel alongside the cowl support but spaced rearwardly therefrom and extending above the lower edge of said section when the latter is in lowered position, whereby the forward portion of the body may be ventilated, a heater deriving heat from the engine and comprising a conduit extending upwardly between said panel and said cowl to a point below the upper edge of said panel to discharge warm air upwardly along the inner face of said section.

5. A motor vehicle comprising in combination a transparent windshield and means associated therewith forming a downwardly extending passage through which air is delivered downwardly to the interior of the vehicle, and also forming a second conduit through which heated air is delivered upwardly along the inner face of the windshield.

In testimony whereof I affix my signature.

LOUIS M. SPENCER.